United States Patent
Cheng et al.

(10) Patent No.: US 10,811,874 B2
(45) Date of Patent: Oct. 20, 2020

(54) LOAD SWITCH INTEGRATED CIRCUIT AND ELECTRONIC DEVICE

(71) Applicant: Shanghai Awinic Technology Co., LTD, Shanghai (CN)

(72) Inventors: Jiantao Cheng, Shanghai (CN); Xucheng Luo, Shanghai (CN); Jianwei Hu, Shanghai (CN)

(73) Assignee: Shanghai Awinic Technology Co., LTD, Shanghai (CN)

(*) Notice: Subject to any disclaimer, the term of this patent is extended or adjusted under 35 U.S.C. 154(b) by 174 days.

(21) Appl. No.: 16/185,850

(22) Filed: Nov. 9, 2018

(65) Prior Publication Data

US 2019/0199093 A1 Jun. 27, 2019

(30) Foreign Application Priority Data

Dec. 22, 2017 (CN) .......................... 2017 1 1401339

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC . H02H 9/046; H01R 13/6485; H01L 27/0248
See application file for complete search history.

(56) References Cited

U.S. PATENT DOCUMENTS

| 6,118,640 A * | 9/2000 | Kwong ................. H02H 9/046 361/56 |
| 6,700,765 B2 | 3/2004 | Ely |
| 7,450,358 B2 | 11/2008 | Gossner |
| 9,979,187 B2 * | 5/2018 | Basler ................... H02H 9/046 |
| 2005/0168894 A1 | 8/2005 | Gossner |
| 2018/0062386 A1 * | 3/2018 | Mallikarjunaswamy ................... H01L 29/735 |

FOREIGN PATENT DOCUMENTS

| CN | 1649227 A | 8/2005 |
| CN | 106451385 A | 2/2017 |
| CN | 106655137 A | 5/2017 |

OTHER PUBLICATIONS

First Chinese Office Action regarding Application No. 201711401339.2 dated Nov. 2, 2018.

* cited by examiner

*Primary Examiner* — Jue Zhang
(74) *Attorney, Agent, or Firm* — Harness, Dickey & Pierce, P.L.C.

(57) ABSTRACT

A load switch integrated circuit and an electronic device are provided. In a case that a surge voltage is applied to an input of the load switch integrated circuit, a surge detection circuit controls a first discharging unit to be switched on to discharge surge energy from an input of the load switch integrated circuit to the ground, and controls a first switch transistor and a second discharging unit to be switched on through a control circuit to discharge surge energy to an output of the load switch integrated circuit to the ground. Compared with a case that surge energy is discharged only by a surge protection circuit in the conventional technology, surge energy is discharged via two paths, and a circuit area is smaller than that in the conventional technology in a case that there is large surge energy to be resisted.

12 Claims, 3 Drawing Sheets

LOAD SWITCH INTEGRATED CIRCUIT AND ELECTRONIC DEVICE

This application claims the priority to Chinese Patent Application No. 201711401339.2, titled "LOAD SWITCH INTEGRATED CIRCUIT AND ELECTRONIC DEVICE", filed on Dec. 22, 2017 with the Chinese Patent Office, which is incorporated herein by reference in its entirety.

FIELD

The present disclosure relates to the field of power electronic technology, and in particular to a load switch integrated circuit and an electronic device.

BACKGROUND

A surge voltage is a transient over-voltage that is larger than a normal operation voltage. The surge voltage lasts for an extremely short time period, which is usually in an order of microsecond. When a surge is generated, the voltage and the current may be much larger than that in a normal case. When the voltage or the current is larger than an upper limit of a semiconductor device, the semiconductor device is directly burnt out. In addition, an accumulation of several slight surges may also result in performance degradation of the semiconductor device, thereby shortening the service life of the semiconductor device.

In the conventional technology, a load switch integrated circuit is generally arranged preceding a to-be-protected circuit. The load switch integrated circuit is as shown in FIG. 1. In a case that a surge is generated, a main switch transistor M1 is controlled to be switched off by a gate control circuit, thereby protecting a following circuit connected to an output OUT. However, in a case that the surge is generated, a waveform of a voltage at an input IN of the load switch integrated circuit is represented as a dotted line as shown in FIG. 2. It can be seen that the surge voltage Vsurge is high, which may break down and burns out components in the load switch integrated circuit. Therefore, in the conventional technology, a surge protection circuit is additionally arranged between the input IN and the ground, as shown in FIG. 1. With the surge protection circuit, in a case that the surge is generated at the input IN, surge energy is timely discharged to the ground and a voltage at the input IN is clamped within an allowed range, which is, for example, a voltage Vclamp shown in FIG. 2, thereby protecting the components in the load switch integrated circuit, thus protecting the following circuit from being damaged due to the surge energy.

In the conventional technical solution, in order to resist large surge energy, it is required that the surge protection circuit has a strong discharging capacity, which may result in a large circuit area of the surge protection circuit, and further result in a large area of the entire load switch integrated circuit.

SUMMARY

A load switch integrated circuit and an electronic device are provided according to the present disclosure, to solve a problem of a large circuit area in the conventional technology.

The following technical solutions are provided according to the present disclosure.

A load switch integrated circuit is provided, which includes: a first switch transistor, a surge detection circuit, a control circuit, a first discharging unit and a second discharging unit.

An input of the first switch transistor, an input of the surge detection circuit and an input of the first discharging unit are connected to an input of the load switch integrated circuit.

An output of the first switch transistor and an input of the second discharging unit are connected to an output of the load switch integrated circuit.

An output of the surge detection circuit is connected to a control terminal of the first discharging unit and an input of the control circuit.

An output of the control circuit is connected to a control terminal of the first switch transistor and a control terminal of the second discharging unit.

An output of the first discharging unit and an output of the second discharging unit are grounded.

The surge detection circuit is configured to: detect whether a surge voltage is applied to the input of the load switch integrated circuit; control, in a case that a surge voltage is applied to the input of the load switch integrated circuit, the first discharging unit to be switched on to discharge surge energy from the input of the load switch integrated circuit to the ground; and control, in a case that a surge voltage is applied to the input of the load switch integrated circuit, the first switch transistor and the second discharging unit to be switched on through the control circuit to discharge surge energy to the output of the load switch integrated circuit to the ground.

In an embodiment, the first discharging unit includes a second switch transistor, and the second discharging unit includes a third switch transistor.

In an embodiment, the first switch transistor, the second switch transistor and the third switch transistor are N-type metal oxide semiconductor field effect transistors.

In an embodiment, the control circuit includes a fourth switch transistor. A first output of the surge detection circuit is connected to a control terminal of the second switch transistor and a control terminal of the third switch transistor. A second output of the surge detection circuit is connected to a control terminal of the fourth switch transistor. An input of the fourth switch transistor is connected to the control terminal of the first switch transistor. An output of the fourth switch transistor is connected to the control terminal of the third switch transistor.

In an embodiment, the load switch integrated circuit further includes a charge pump. An output of the charge pump is connected to the control terminal of the first switch transistor.

In an embodiment, the fourth switch transistor is an N-type metal oxide semiconductor field effect transistor.

An electronic device is further provided, which includes any one of the load switch integrated circuits described above.

A load switch integrated circuit is provided according to the present disclosure. In a case that a surge voltage is applied to an input of the load switch integrated circuit, a surge detection circuit controls a first discharging unit to be switched on to discharge surge energy from an input of the load switch integrated circuit to the ground, and controls a first switch transistor and a second discharging unit to be switched on through a control circuit to discharge surge energy to an output of the load switch integrated circuit to the ground. That is, compared with a case that surge energy is discharged only by a surge protection circuit in the conventional technology, in the present disclosure, surge energy is discharged via two paths, and a circuit area is smaller than that in the conventional technology in a case that there is large surge energy to be resisted.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments of the present disclosure without any creative work should fall within the protection scope of the present disclosure.

A load switch integrated circuit is provided according to the present disclosure, to solve a problem of a large circuit area in the conventional technology.

Figure 1:
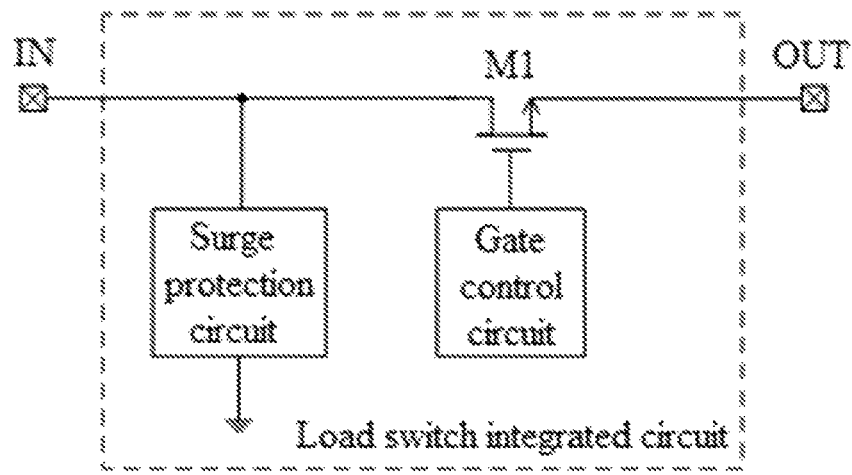
FIG. 1 is a schematic structural diagram of a load switch integrated circuit according to the conventional technology.
Figure 2:
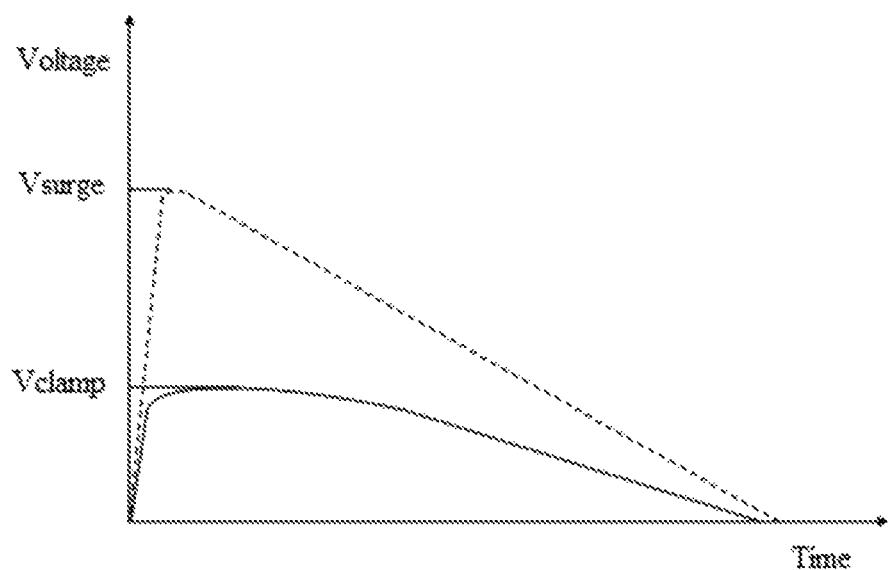
FIG. 2 is a schematic diagram showing a protection effect of a surge protection circuit according to the conventional technology.
Figure 3:
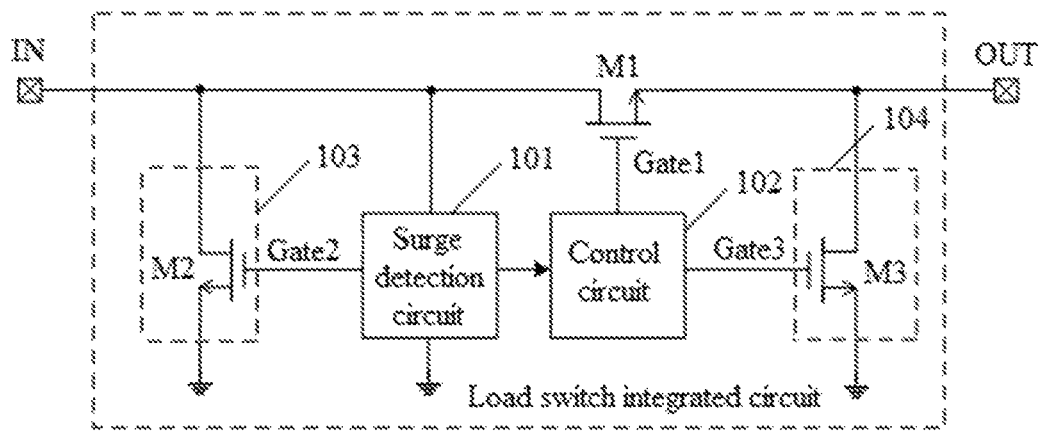
FIG. 3 is a schematic structural diagram of a load switch integrated circuit according to an embodiment of the present disclosure.

Reference is made to FIG. 3, the load switch integrated circuit includes: a first switch transistor M1, a surge detection circuit 101, a control circuit 102, a first discharging unit 103 and a second discharging unit 104.

An input of the first switch transistor M1, an input of the surge detection circuit 101 and an input of the first discharging unit 103 are connected to an input IN of the load switch integrated circuit.

An output of the first switch transistor M1 and an input of the second discharging unit 104 are connected to an output OUT of the load switch integrated circuit.

An output of the surge detection circuit 101 is connected to a control terminal of the first discharging unit 103 and an input of the control circuit 102.

An output of the control circuit 102 is connected to a control terminal of the first switch transistor M1 and a control terminal of the second discharging unit 104.

An output of the first discharging unit 103 and an output of the second discharging unit 104 are grounded.

The surge detection circuit 101 is configured to detect whether a surge voltage is applied to the input IN of the load switch integrated circuit. In a case that a surge voltage is applied to the input IN of the load switch integrated circuit, the surge detection circuit 101 outputs two signals. The first discharging unit 103 is controlled to be switched on in response to one signal outputted by the surge detection circuit 101, to discharge surge energy from the input IN of the load switch integrated circuit to the ground, and the first switch transistor M1 and the second discharging unit 104 are controlled to be switched on by the control circuit 102 in response to the other signal outputted by the surge detection circuit 101, to discharge surge energy to the output OUT of the load switch integrated circuit to the ground, thereby achieving two-path surge energy discharging.

In an embodiment, as shown in FIG. 3, the first discharging unit 103 includes a second switch transistor M2, and the second discharging unit 104 includes a third switch transistor M3.

In an embodiment, the first switch transistor M1, the second switch transistor M2 and the third switch transistor M3 are N-type metal oxide semiconductor field effect transistors, which may operate under a high power.

The first switch transistor M1 is a main switch transistor of the load switch integrated circuit. In a case that it is required to switch on the load switch integrated circuit, the first switch transistor M1 is switched on to connect the input IN of the load switch integrated circuit with the output OUT of the load switch integrated circuit, and VOUT=VIN. In a case that it is required to switch off the load switch integrated circuit, the first switch transistor M1 is switched off.

In a case that the surge detection circuit 101 detects that a surge voltage is applied to the input IN of the load switch integrated circuit, the second switch transistor M2 is switched on by increasing a voltage at a gate Gate 2 of the second switch transistor M2 to a voltage capable of switching on the second switch transistor M2, to discharge the surge energy from the input IN of the load switch integrated circuit to the ground via a path thus formed. In a case that the surge voltage disappears, the second switch transistor M2 is switched off by shorting the gate Gate 2 of the second switch transistor M2 to the ground. Since the second switch transistor M2 is always in a switched-off state in a case that no surge voltage is applied, the operation of other circuits is not affected.

Figure 4:
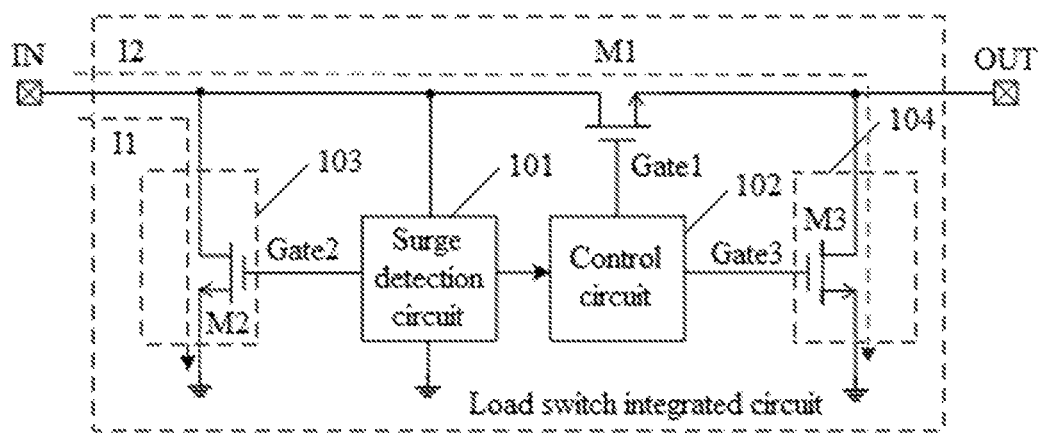
FIG. 4 is a schematic diagram showing a current discharging path of a load switch integrated circuit according to an embodiment of the present disclosure.

In a structure shown in FIG. 3, in addition to the second switch transistor M2, the surge protection function may also be achieved by cooperation of the first switch transistor M1 and the third switch transistor M3. Specifically, in a case that a surge is generated, the second switch transistor M2 is switched on to form a first path (a path I1 shown in FIG. 4) for discharging the surge energy. In addition, the first switch transistor M1 is switched on by clamping a voltage at a gate Gate 1 of the first switch transistor M1 to a voltage capable of switching on the first switch transistor M1, and the third switch transistor M3 is switched on by increasing a voltage at a gate Gate 3 of the third switch transistor M3 to a voltage capable of switching on the third switch transistor M3. The first switch transistor M1 and the third switch transistor M3 are connected with each other in series to form a second path (a path I2 shown in FIG. 4) for discharging the surge energy. Since the second switch transistor M2 and the third switch transistor M3 are always in a switched-off state in a case that no surge voltage is applied, the operation of other circuits is not affected.

Compared with a case that the surge energy is discharged only by a surge protection circuit in the conventional technology, with the load switch integrated circuit according to the present disclosure, the surge energy is discharged via two paths. A second path is additionally arranged for discharging the surge energy, such that the surge protection capability of a chip is improved, and the circuit area is smaller than that in the conventional technology in a case that there is large surge energy to be resisted.

It is to be noted that the discharging unit may also be implemented by another controllable device, as long as the controllable device has a certain discharging capability and a small circuit area, which should fall within the protection scope of the present disclosure.

Figure 5:
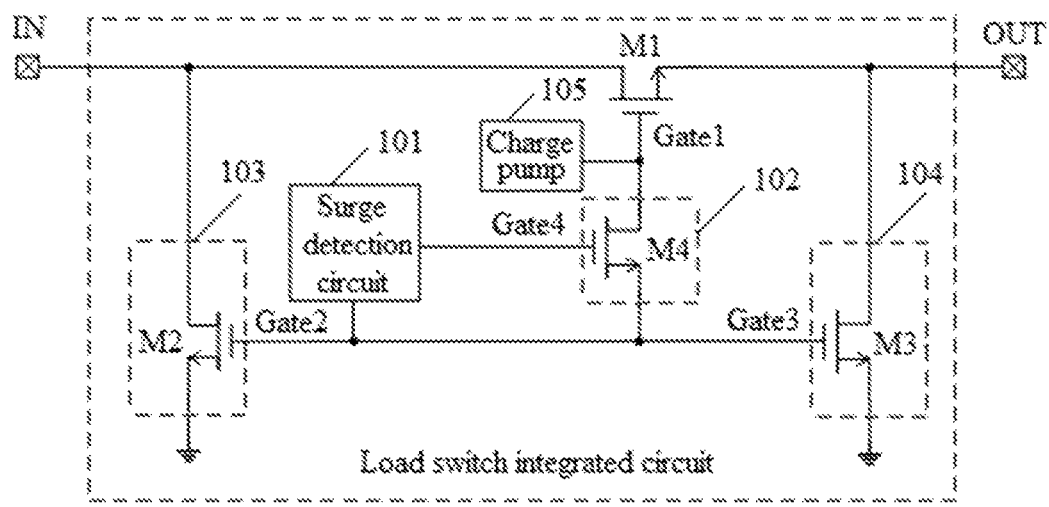
FIG. 5 is a schematic structural diagram of a load switch integrated circuit according to another embodiment of the present disclosure.

A load switch integrated circuit is further provided according to another embodiment of the present disclosure. Based on the above embodiment and FIGS. 3 and 4, in an embodiment, as shown in FIG. 5, the control circuit 102 includes a fourth switch transistor M4.

A first output of the surge detection circuit 101 is connected to a control terminal of the second switch transistor M2 and a control terminal of the third switch transistor M3.

A second output of the surge detection circuit 101 is connected to a control terminal of the fourth switch transistor M4.

An input of the fourth switch transistor M4 is connected to the control terminal of the first switch transistor M1.

An output of the fourth switch transistor M4 is connected to the control terminal of the third switch transistor M3.

In an embodiment, as shown in FIG. 5, the load switch integrated circuit further includes a charge pump 105. An output of the charge pump 105 is connected to the control terminal of the first switch transistor M1.

In an embodiment, the fourth switch transistor M4 is an N-type metal oxide semiconductor field effect transistor.

As shown in FIG. 5, in a case that it is required to switch on the first switch transistor M1, a voltage at the gate Gate 1 of the first switch transistor M1 is increased to be higher than a voltage at the output OUT by the charge bump 105, to switch on the first switch transistor M1. In addition, the first switch transistor M1 may be switched off also by means of the charge pump 105. A gate of the second switch transistor M2 and a gate of the third switch transistor M3 are shorted together, which are controlled by the surge detection circuit 101. In a case that no surge is generated, the gate Gate 3 of the third switch transistor M3 is grounded. In a case that a surge is generated, the fourth switch transistor M4 is switched on, and the gate Gate 1 of the first switch transistor M1 is shorted to the gate Gate 3 of the third switch transistor M3, to increase a voltage at the gate Gate 3 of the third switch transistor M3 to a certain voltage (for example, 5V) under the control of the surge detection circuit 101. In this case, the first switch transistor M1, the second switch transistor M2 and the third switch transistor M3 are all switched on, to discharge the surge energy together. Since the voltage at the gate Gate 1 of the first switch transistor M1 is clamped to be a low voltage, the voltage at the output OUT may not be increased excessively in a case that a surge is generated, thereby protecting a device connected to the output OUT from being damaged due to the surge.

Other structures and principles are the same as that described in the above embodiments, which is not repeated herein.

An electronic device is further provided according to another embodiment of the present disclosure, which includes a load switch integrated circuit described in any one of the above embodiments.

Specifically, the electronic device may be a mobile terminal such as a cell phone and a tablet computer, or another universal serial bus (USB) interface device, which is not specifically limited herein. Any electronic device including the load switch integrated circuit described in the above embodiment should fall within the protection scope of the present disclosure.

The embodiments of the present disclosure are described in a progressive manner, and each embodiment places emphasis on the difference from other embodiments. Therefore, for the same or similar parts between the embodiments, one may refer to the description of other embodiments. For the device according to the embodiments, the device corresponds to the method according to the embodiments. Therefore, the description thereof is simple, and for the related parts, one may refer to the description of the method embodiments.

What is described above is only preferred embodiments of the present disclosure and is not intended to limit the present disclosure in any way. The preferred embodiments of the present disclosure are disclosed above, which should not be interpreted as limiting the present disclosure. Numerous alternations, modifications, and equivalents can be made to the technical solutions of the present disclosure by those skilled in the art in light of the methods and technical content disclosed herein without deviation from the scope of the present disclosure. Therefore, any alternations, modifications, and equivalents made to the embodiments above according to the technical essential of the present disclosure without deviation from the scope of the present disclosure should fall within the scope of protection of the present disclosure.

The invention claimed is:

1. A load switch integrated circuit, comprising:
  a first switch transistor;
  a surge detection circuit;
  a control circuit;
  a first discharging unit; and
  a second discharging unit, wherein
  an input of the first switch transistor, an input of the surge detection circuit and an input of the first discharging unit are connected to an input of the load switch integrated circuit,
  an output of the first switch transistor and an input of the second discharging unit are connected to an output of the load switch integrated circuit,
  an output of the surge detection circuit is connected to a control terminal of the first discharging unit and an input of the control circuit,
  an output of the control circuit is connected to a control terminal of the first switch transistor and a control terminal of the second discharging unit,
  an output of the first discharging unit and an output of the second discharging unit are grounded, and
  the surge detection circuit is configured to:
    detect whether a surge voltage is applied to the input of the load switch integrated circuit;
    control, in a case that a surge voltage is applied to the input of the load switch integrated circuit, the first discharging unit to be switched on to discharge surge energy from the input of the load switch integrated circuit to the ground; and
    control, in a case that a surge voltage is applied to the input of the load switch integrated circuit, the first switch transistor and the second discharging unit to be switched on through the control circuit to discharge surge energy to the output of the load switch integrated circuit to the ground.

2. The load switch integrated circuit according to claim 1, wherein the first discharging unit comprises a second switch transistor, and the second discharging unit comprises a third switch transistor.

3. The load switch integrated circuit according to claim 2, wherein the first switch transistor, the second switch transistor and the third switch transistor are N-type metal oxide semiconductor field effect transistors.

4. The load switch integrated circuit according to claim 2, wherein the control circuit comprises a fourth switch transistor, and wherein
 a first output of the surge detection circuit is connected to a control terminal of the second switch transistor and a control terminal of the third switch transistor,
 a second output of the surge detection circuit is connected to a control terminal of the fourth switch transistor,
 an input of the fourth switch transistor is connected to the control terminal of the first switch transistor, and
 an output of the fourth switch transistor is connected to the control terminal of the third switch transistor.

5. The load switch integrated circuit according to claim 4, further comprising a charge pump, wherein an output of the charge pump is connected to the control terminal of the first switch transistor.

6. The load switch integrated circuit according to claim 4, wherein the fourth switch transistor is an N-type metal oxide semiconductor field effect transistor.

7. An electronic device, comprising a load switch integrated circuit, wherein the load switch integrated circuit comprises: a first switch transistor, a surge detection circuit, a control circuit, a first discharging unit and a second discharging unit, and wherein
 an input of the first switch transistor, an input of the surge detection circuit and an input of the first discharging unit are connected to an input of the load switch integrated circuit,
 an output of the first switch transistor and an input of the second discharging unit are connected to an output of the load switch integrated circuit,
 an output of the surge detection circuit is connected to a control terminal of the first discharging unit and an input of the control circuit,
 an output of the control circuit is connected to a control terminal of the first switch transistor and a control terminal of the second discharging unit,
 an output of the first discharging unit and an output of the second discharging unit are grounded, and
 the surge detection circuit is configured to:
  detect whether a surge voltage is applied to the input of the load switch integrated circuit;
  control, in a case that a surge voltage is applied to the input of the load switch integrated circuit, the first discharging unit to be switched on to discharge surge energy from the input of the load switch integrated circuit to the ground; and
  control, in a case that a surge voltage is applied to the input of the load switch integrated circuit, the first switch transistor and the second discharging unit to be switched on through the control circuit to discharge surge energy to the output of the load switch integrated circuit to the ground.

8. The electronic device according to claim 7, wherein the first discharging unit comprises a second switch transistor, and the second discharging unit comprises a third switch transistor.

9. The electronic device according to claim 8, wherein the first switch transistor, the second switch transistor and the third switch transistor are N-type metal oxide semiconductor field effect transistors.

10. The electronic device according to claim 8, wherein the control circuit comprises a fourth switch transistor, and wherein
 a first output of the surge detection circuit is connected to a control terminal of the second switch transistor and a control terminal of the third switch transistor,
 a second output of the surge detection circuit is connected to a control terminal of the fourth switch transistor,
 an input of the fourth switch transistor is connected to the control terminal of the first switch transistor, and
 an output of the fourth switch transistor is connected to the control terminal of the third switch transistor.

11. The electronic device according to claim 10, the load switch integrated circuit further comprises a charge pump, wherein an output of the charge pump is connected to the control terminal of the first switch transistor.

12. The electronic device according to claim 10, wherein the fourth switch transistor is an N-type metal oxide semiconductor field effect transistor.

\* \* \* \* \*